United States Patent
Huang et al.

(10) Patent No.: US 8,183,795 B2
(45) Date of Patent: May 22, 2012

(54) LED CURRENT-SUPPLYING CIRCUIT AND LED CURRENT-CONTROLLING CIRCUIT

(75) Inventors: Chung-Tsai Huang, Taoyuan Hsien (TW); Shang-Jin Yan, Taoyuan Hsien (TW); Po-Yi Lee, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 424 days.

(21) Appl. No.: 12/489,984

(22) Filed: Jun. 23, 2009

(65) Prior Publication Data

US 2010/0001661 A1 Jan. 7, 2010

(30) Foreign Application Priority Data

Jul. 1, 2008 (TW) .............................. 97124766 A

(51) Int. Cl.
*G05F 1/00* (2006.01)
*H05B 37/02* (2006.01)
*H05B 39/04* (2006.01)
*H05B 41/36* (2006.01)

(52) U.S. Cl. ........ 315/294; 315/291; 315/299; 315/300; 315/307

(58) Field of Classification Search .................. None
See application file for complete search history.

(56) References Cited

U.S. PATENT DOCUMENTS

| | | | | |
|---|---|---|---|---|
| 6,614,131 | B2 * | 9/2003 | Lentini et al. | 307/39 |
| 7,071,582 | B2 * | 7/2006 | Sae-Ueng et al. | 307/83 |
| 7,109,667 | B2 * | 9/2006 | Matsushima et al. | 315/224 |
| 2007/0070658 | A1 * | 3/2007 | Na | 363/21.01 |
| 2008/0211419 | A1 * | 9/2008 | Garrity | 315/224 |

* cited by examiner

*Primary Examiner* — Anh Tran
(74) *Attorney, Agent, or Firm* — Kirton McConkie; Evan R. Witt

(57) ABSTRACT

A LED current-controlling circuit includes a first magnetic amplifier, a first current detecting circuit, a first magnetic amplifier controller and a first diode. The first magnetic amplifier is connected to an input terminal of the LED current-controlling circuit and the first LED string. The first current detecting circuit is connected to the first LED string in series for detecting the first current flowing through the first LED string. The first magnetic amplifier controller is used for controlling on/off statuses of the first magnetic amplifier. The first diode is connected to an output terminal of the first magnetic amplifier, the first LED string and the first magnetic amplifier controller. The first magnetic amplifier controller controls on/off statuses of the first magnetic amplifier according to the magnitude of the first current, thereby maintaining the first current at a specified DC current level.

18 Claims, 5 Drawing Sheets

LED CURRENT-SUPPLYING CIRCUIT AND LED CURRENT-CONTROLLING CIRCUIT

FIELD OF THE INVENTION

The present invention relates to a current-supplying circuit and a current-controlling circuit, and more particularly to a LED current-supplying circuit and a LED current-controlling circuit.

BACKGROUND OF THE INVENTION

In recent years, light emitting diodes (LEDs) capable of emitting light with high luminance and high illuminating efficiency have been developed. In comparison with a common incandescent light, a LED has lower power consumption, long service life, and quick response speed. With the maturity of the LED technology, LEDs will replace all conventional lighting facilities. Until now, LEDs are widely used in many aspects of daily lives, such as automobile lighting devices, handheld lighting devices, backlight sources for LCD panels, traffic lights, indicator board displays, and the like.

When an electronic device (e.g. a LCD panel) having multiple LED strings is operated, the currents passing through all LED strings shall be identical for a purpose of obtaining uniform brightness. Due to different inherent characteristics of these LED strings, the currents passing therethrough are not identical and the brightness is usually not uniform. Therefore, the use life of individual LED string is shortened or even the whole electronic device has a breakdown.

For obtaining uniform brightness of multiple LED strings, several current sharing techniques have been disclosed. For example, referring to FIG. 1, a schematic circuit block diagram of a conventional LED current-supplying circuit is illustrated. As shown in FIG. 1, the LED current-supplying circuit 1 principally comprises a main power rectifying circuit 11, a primary DC-to-DC converting circuit 12, a first secondary DC-to-DC converting circuit 13a, a second secondary DC-to-DC converting circuit 13b, a first current-controlling circuit 14a and a second current-controlling circuit 14b. The main power rectifying circuit 11 is electrically connected to the primary DC-to-DC converting circuit 12. An AC input voltage $V_{in}$ is rectified by the main power rectifying circuit 11 to generate a rectified input voltage $V_a$. The input terminal of the primary DC-to-DC converting circuit 12 is electrically connected to the output terminal of the main power rectifying circuit 11. The output terminal of the primary DC-to-DC converting circuit 12 is electrically connected to the input terminals of the first secondary DC-to-DC converting circuit 13a and the second secondary DC-to-DC converting circuit 13b through a DC bus 16. By the primary DC-to-DC converting circuit 12, the rectified input voltage $V_a$ is converted into a bus voltage $V_{DC}$ having a specified DC voltage value. The first secondary DC-to-DC converting circuit 13a and the second secondary DC-to-DC converting circuit 13b are connected to the DC bus 16 for converting the bus voltage $V_{DC}$ into a first DC voltage $V_1$ and a second DC voltage $V_2$, which are required for powering at least one LED string. The first current-controlling circuit 14a is electrically connected to the output terminal of the first secondary DC-to-DC converting circuit 13a and the input terminal of a first LED string 15a. The second current-controlling circuit 14b is electrically connected to the output terminal of the second secondary DC-to-DC converting circuit 13b and the input terminal of a second LED string 15b. Under control of the first current-controlling circuit 14a and the second current-controlling circuit 14b, a first current $I_1$ flowing through the first LED string 15a and a second current $I_2$ flowing through the second LED string 15b have the same magnitude. As a consequence, the first LED string 15a and the second LED string 15b have the same brightness.

For providing the same current magnitude to each LED string, the secondary DC-to-DC converting circuits are indispensable to the conventional LED current-controlling circuits. Therefore, the overall circuitry cost is high but the current density is low. In the conventional LED current-supplying circuit, a specified bus voltage $V_{DC}$ is generated at the DC bus by the primary DC-to-DC converting circuit 12, and the bus voltage $V_{DC}$ is converted into regulated DC current required for the LED strings by the secondary DC-to-DC converting circuits. Under this circumstance, the conventional LED current-supplying circuit needs two-stage DC-to-DC converting circuits. Since there is a constant voltage drop between the input terminal and the output terminal of the secondary DC-to-DC converting circuit, the voltage drop causes power loss. Generally, the power loss is increased as the output voltage of the LED string is increased. In other words, the conventional LED current-supplying circuit has low efficiency, high circuitry cost and low current density.

There is a need of providing improved LED current-supplying circuit and LED current-controlling circuit to obviate the drawbacks encountered from the prior art.

SUMMARY OF THE INVENTION

It is an object of the present invention to provide a LED current-controlling circuit for directly receiving the pulse width modulation voltage from the primary DC-to-DC converting circuit and generating regulated DC voltage to power the LCD strings. By adjusting parameters of the magnetic amplifier controller, the currents passing through all LED strings are identical and thus all LEDs have the same brightness values. Consequently, the overall circuitry cost is reduced but the current intensity is enhanced.

Another object of the present invention provides a LED current-supplying circuit using the LED current-controlling circuit of the present invention so as to achieve high efficiency, low circuitry cost and high current density.

In accordance with an aspect of the present invention, there is provided a LED current-controlling circuit for receiving a pulse width modulation voltage and outputting a first current having a specified DC current level required to power a first LED string of multiple LED strings. The LED current-controlling circuit includes a first magnetic amplifier, a first current detecting circuit, a first magnetic amplifier controller and a first diode. The first magnetic amplifier has a terminal connected to an input terminal of the LED current-controlling circuit and the other terminal connected to the first LED string. The first current detecting circuit is connected to the first LED string in series for detecting the first current flowing through the first LED string. The first magnetic amplifier controller is connected to the first current detecting circuit for controlling on/off statuses of the first magnetic amplifier. The first diode has a terminal connected to an output terminal of the first magnetic amplifier and the first LED string and the other terminal connected to the first magnetic amplifier controller. The first magnetic amplifier controller controls on/off statuses of the first magnetic amplifier according to the magnitude of the first current, thereby maintaining the first current at the specified DC current level.

In accordance with another aspect of the present invention, there is provided a LED current-supplying circuit for driving a first LED string and a second LED string. The LED current-supplying circuit includes a main power rectifying circuit, a primary DC-to-DC converting circuit, a first current-controlling circuit, and a second current-controlling circuit. The main power rectifying circuit receives and rectifies an AC input voltage into a rectified input voltage. The primary DC-to-DC converting circuit has an input terminal connected to an output terminal of the main power rectifying circuit for converting the rectified input voltage into a first pulse width modulation voltage and a second pulse width modulation voltage. The first current-controlling circuit has an input terminal connected to a first output terminal of the primary DC-to-DC converting circuit and an output terminal connected to the first LED string. The second current-controlling circuit has an input terminal connected to a second output terminal of the primary DC-to-DC converting circuit and an output terminal connected to the second LED string. The first pulse width modulation voltage and the second pulse width modulation voltage are respectively received by the first current-controlling circuit and the second current-controlling circuit, thereby generating a first current and a second current.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1:
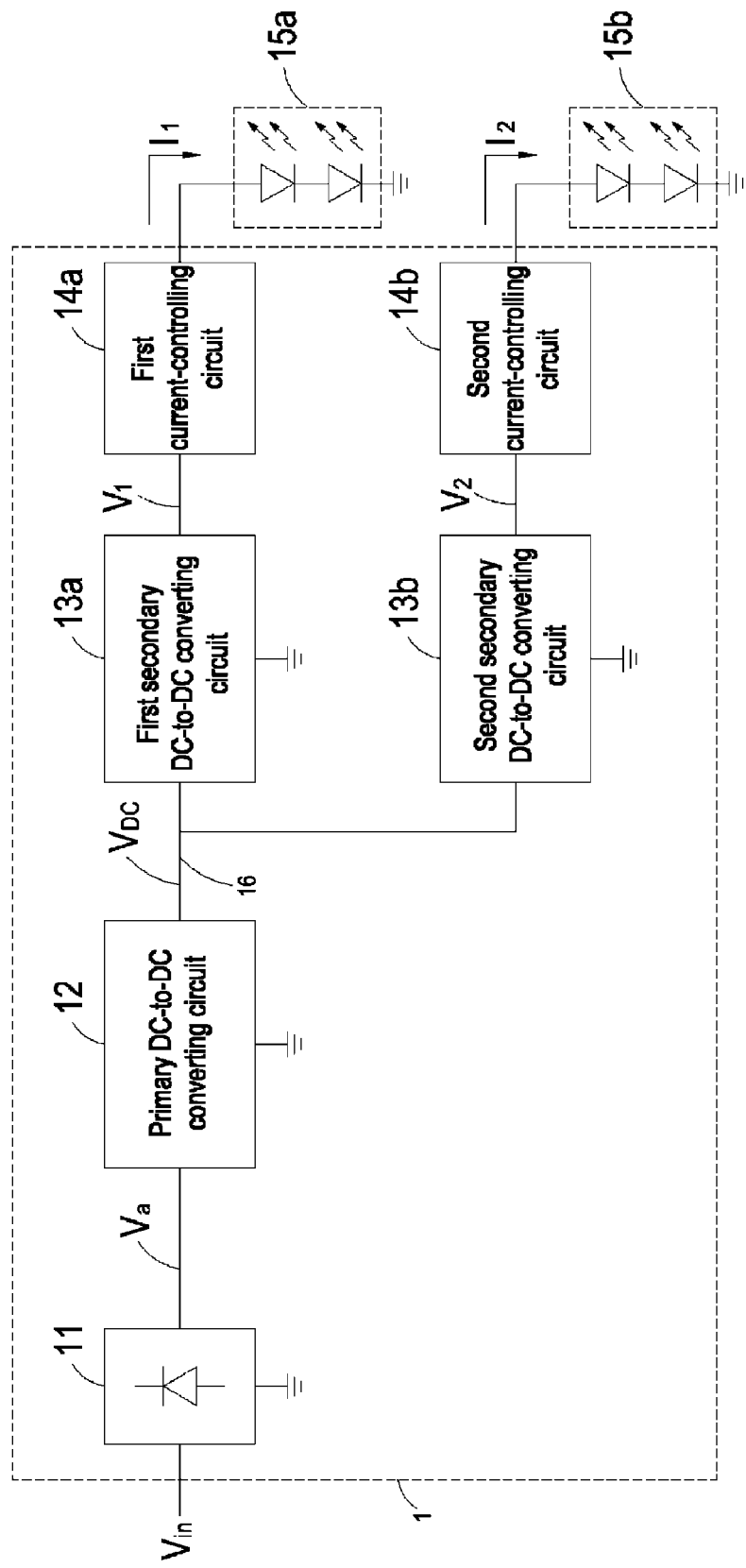
FIG. 1 is a schematic circuit block diagram of a conventional LED current-supplying circuit.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention relates to a LED current-supplying circuit and a LED current-controlling circuit. The LED current-supplying circuit and the LED current-controlling circuit are applied to multiple LED strings. Each LED string includes a plurality of LEDs. For clarification, each LED string having two LEDs is shown in the drawings.

Figure 2:
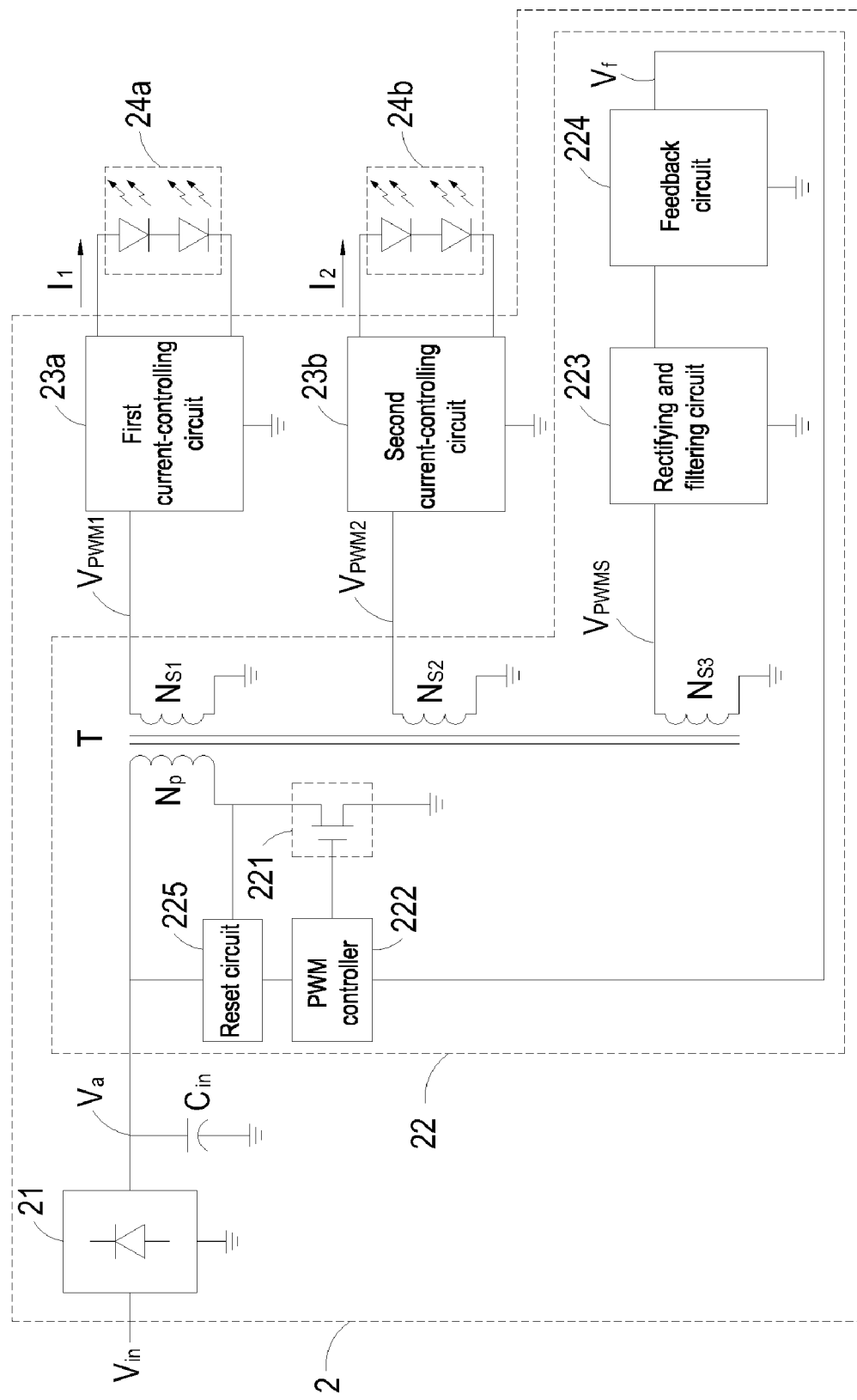
FIG. 2 is a schematic circuit block diagram of a LED current-supplying circuit according to a preferred embodiment of the present invention.

FIG. 2 is a schematic circuit block diagram of a LED current-supplying circuit according to a preferred embodiment of the present invention. As shown in FIG. 2, the LED current-supplying circuit 2 principally comprises a main power rectifying circuit 21, a primary DC-to-DC converting circuit 22, a first current-controlling circuit 23a, a second current-controlling circuit 23b and an input capacitor $C_{in}$. The main power rectifying circuit 21 is electrically connected to the input terminal of the primary DC-to-DC converting circuit 22 and the input capacitor $C_{in}$. An AC input voltage $V_{in}$ is rectified by the main power rectifying circuit 21 to generate a rectified input voltage $V_a$. The input terminal of the primary DC-to-DC converting circuit 22 is electrically connected to the output terminal of the main power rectifying circuit 21 and the input capacitor $C_{in}$. A first output terminal of the primary DC-to-DC converting circuit 22 is electrically connected to the input terminal of the first current-controlling circuit 23a. A second output terminal of the primary DC-to-DC converting circuit 22 is electrically connected to the input terminal of the second current-controlling circuit 23b. By the first current-controlling circuit 23a and the second current-controlling circuit 23b, the rectified input voltage $V_a$ is respectively converted into a first pulse width modulation voltage $V_{PWM1}$ and a second pulse width modulation voltage $V_{PWM2}$, which are required for powering LED strings. The output terminals of the first current-controlling circuit 23a and the second current-controlling circuit 23b are electrically connected to a first LED string 24a and a second LED string 24b, respectively. When the first pulse width modulation voltage $V_{PWM1}$ and the second pulse width modulation voltage $V_{PWM2}$ are respectively received by the first current-controlling circuit 23a and the second current-controlling circuit 23b, regulated DC currents required for powering the first LED string 24a and the second LED string 24b are generated. In this embodiment, a first current $I_1$ flowing through the first LED string 24a and a second current $I_2$ flowing through the second LED string 24b have the same magnitude. As a consequence, the first LED string 24a and the second LED string 24b have the same brightness. In some embodiments, the first current $I_1$ flowing through the first LED string 24a and the second current $I_2$ flowing through the second LED string 24b have different values.

Please refer to FIG. 2 again. The primary DC-to-DC converting circuit 22 comprises a transformer T, a switching circuit 221, a pulse width modulation (PWM) controller 222, a rectifying and filtering circuit 223 and a feedback circuit 224. The transformer T comprises a primary winding assembly $N_p$, a first secondary winding assembly $N_{s1}$, a second secondary winding assembly $N_{s2}$ and a third secondary winding assembly $N_{s3}$. The primary winding assembly $N_p$ of the transformer T is electrically connected to the switching circuit 221 and the output terminal of the main power rectifying circuit 21. The rectified input voltage $V_a$ is received by the primary winding assembly $N_p$ of the transformer T and then magnetically transmitted to the first secondary winding assembly $N_{s1}$, the second secondary winding assembly $N_{s2}$ and the third secondary winding assembly $N_{s3}$ of the transformer T. The switching circuit 221 is electrically connected to the primary winding assembly $N_p$ of the transformer T, a common terminal and the PWM controller 222. Under control of the PWM controller 222, the switching circuit 221 is selectively conducted or shut off so as to control the amount of electricity to be received by the primary winding assembly $N_p$ of the transformer T. The electricity received by the primary winding assembly $N_p$ of the transformer T is magnetically transmitted to the first secondary winding assembly $N_{s1}$, the second secondary winding assembly $N_{s2}$ and the third secondary winding assembly $N_{s3}$ of the transformer T. Consequently, the first secondary winding assembly $N_{s1}$, the second secondary winding assembly $N_{s2}$ and the third secondary winding assembly $N_{s3}$ of the transformer T generate the first pulse width modulation voltage $V_{PWM1}$, the second pulse width modulation voltage $V_{PWM2}$ and a main pulse width modulation voltage $V_{PWMS}$, respectively. The input terminal of the rectifying and filtering circuit 223 is electrically connected to the third secondary winding assembly $N_{s3}$ of the transformer T. The output terminal of the rectifying and filtering circuit 223 is electrically connected to the feedback circuit 224. By the rectifying and filtering circuit 223, the main pulse width modulation voltage $V_{PWMS}$ issued by the third secondary winding assembly $N_{s3}$ is rectified and filtered into an DC output voltage $V_o$. The input terminal of the feedback circuit 224 is electrically connected to the output terminal of the rectifying and filtering circuit 223. The output terminal of the feedback circuit 224 is electrically connected to the PWM controller 222. According to the DC output voltage $V_o$, the feedback circuit 224 issues a feedback signal $V_f$ to the PWM controller 222.

Please refer to FIG. 2 again. By the first current-controlling circuit 23a and the second current-controlling circuit 23b, the electrical energy provided by the first pulse width modulation voltage $V_{PWM1}$ and the second pulse width modulation voltage $V_{PWM2}$ are balanced and then transmitted to the first LED string 24a and the second LED string 24b. Under this circumstance, the first current $I_1$ flowing through the first LED string 24a and the second current $I_2$ flowing through the second LED string 24b have the same magnitude so that the first LED string 24a and the second LED string 24b have the same brightness. In some embodiments, the first current $I_1$ flowing through the first LED string 24a and the second current $I_2$ flowing through the second LED string 24b have different values.

In this embodiment, the turn ratio of the primary winding assembly $N_p$ to the first secondary winding assembly $N_{s1}$, the turn ratio of the primary winding assembly $N_p$ to the second secondary winding assembly $N_{s2}$, and the turn ratio of the primary winding assembly $N_p$ to the third secondary winding assembly $N_{s3}$ are equal. As a result, the waveforms of the first pulse width modulation voltage $V_{PWM1}$, the second pulse width modulation voltage $V_{PWM2}$ and the main pulse width modulation voltage $V_{PWMS}$ are identical. For maintaining the average voltage of the first pulse width modulation voltage $V_{PWM1}$ and the second pulse width modulation voltage $V_{PWM2}$ within a specified range (e.g. 12~24 volt), the PWM controller 222 controls the on or off duration of the switching circuit 221 according to the feedback signal $V_f$. In other words, the duty ratios of the first pulse width modulation voltage $V_{PWM1}$ and the second pulse width modulation voltage $V_{PWM2}$ are automatically adjusted. Therefore, the primary DC-to-DC converting circuit 22 will generate the first pulse width modulation voltage $V_{PWM1}$ and the second pulse width modulation voltage $V_{PWM2}$ to the first current-controlling circuit 23a and the second current-controlling circuit 23b.

An example of the DC-to-DC converting circuit 22 includes but is not limited to a fly back DC-to-DC converting circuit, a forward DC-to-DC converting circuit or a clamp-forward DC-to-DC converting circuit. In some embodiments, the DC-to-DC converting circuit 22 further comprises a reset circuit 225. The reset circuit 225 is electrically connected to the primary winding assembly $N_p$ of the transformer T. By the reset circuit 225, the electrical energy in the primary winding assembly $N_p$ of the transformer T is reset.

Figure 3:
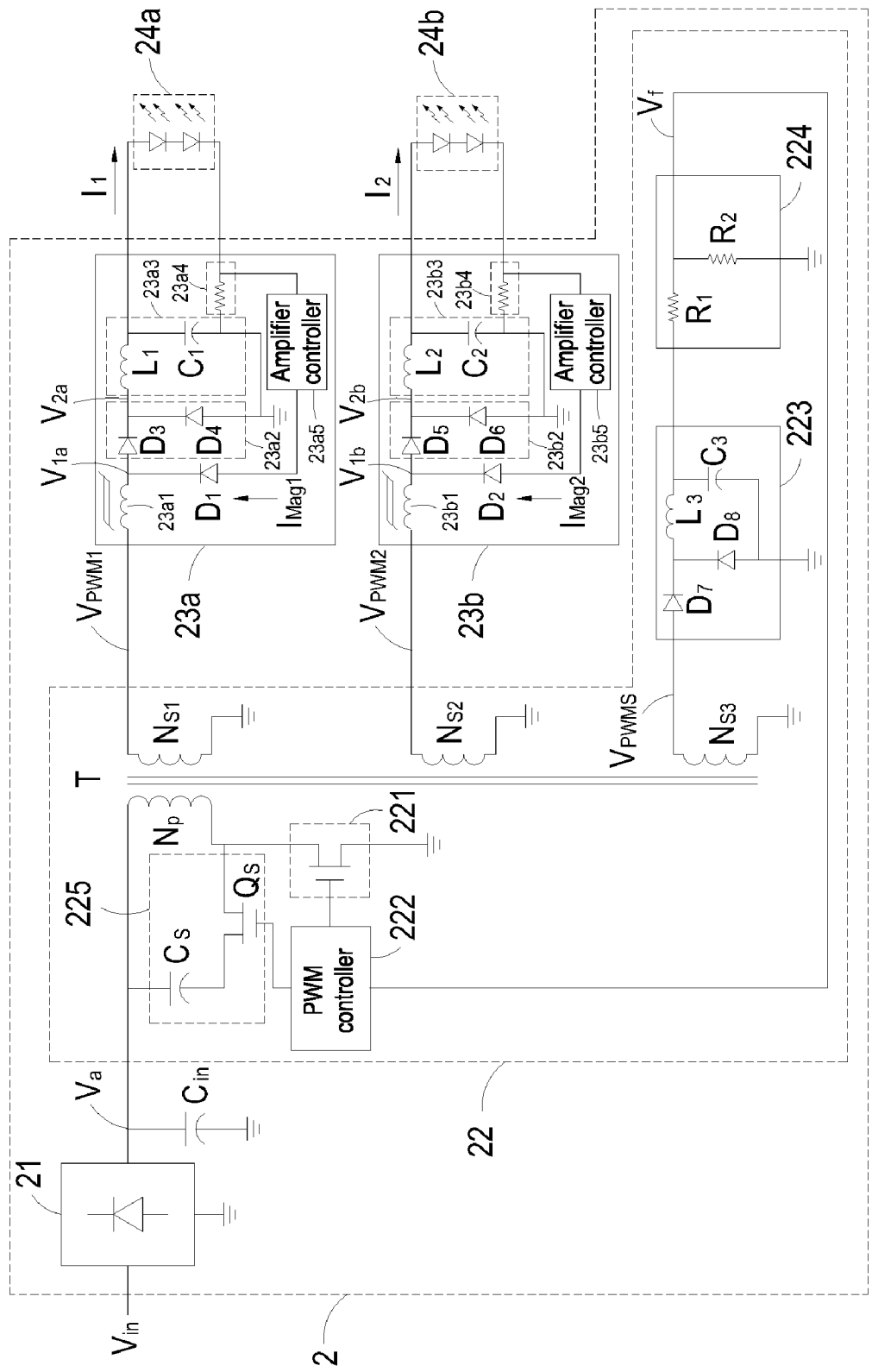
FIG. 3 is a schematic detailed circuit diagram of the LED current-supplying circuit of FIG. 2.

FIG. 3 is a schematic detailed circuit diagram of the LED current-supplying circuit of FIG. 2. The reset circuit 225 comprises a reset capacitor $C_s$ and a reset switch element $Q_s$. The reset capacitor $C_s$ and the reset switch element $Q_s$ collectively form a discharge loop with the primary winding assembly $N_p$ of the transformer T. Consequently, the primary winding assembly $N_p$ of the transformer T is discharged through the reset capacitor CS and the reset switch element $Q_s$, thereby resetting the electrical energy of the transformer T. Under control of the PWM controller 222, the reset switch element $Q_s$ is selectively conducted or shut off. In some embodiments, by a resonance circuit, the reset circuit 225 will form a discharge loop with the primary winding assembly $N_p$ of the transformer T.

Please refer to FIG. 3 again. The first current-controlling circuit 23a comprises a first magnetic amplifier 23a1, a first rectifying circuit 23a2, a first filtering circuit 23a3, a first current detecting circuit 23a4, a first diode $D_1$ and a first magnetic amplifier controller 23a5. The second current-controlling circuit 23b comprises a second magnetic amplifier 23b1, a second rectifying circuit 23b2, a second filtering circuit 23b3, a second current detecting circuit 23b4, a second diode $D_2$ and a second magnetic amplifier controller 23b5. The operation principles of the first current-controlling circuit 23a are similar to those of the second current-controlling circuit 23b. For clarification, only the first current-controlling circuit 23a is illustrated as follows.

In the first current-controlling circuit 23a, the first magnetic amplifier 23a1 has a terminal connected to the first output terminal of the DC-to-DC converting circuit 22 and the other terminal connected to the input terminal of the first rectifying circuit 23a2 and the cathode of the first diode $D_1$. The input terminal of the first filtering circuit 23a3 is connected to the output terminal of the first rectifying circuit 23a2. The other terminal of the first filtering circuit 23a3 is connected to the first LED string 24a. The first current detecting circuit 23a4 is connected to the first LED string 24a and the output loop of the first current-controlling circuit 23a in series. The first magnetic amplifier controller 23a5 is connected to the anode of the first diode $D_1$ and the first current detecting circuit 23a4.

In this embodiment, the first current detecting circuit 23a4 and the second current detecting circuit 23b4 are resistors. The first rectifying circuit 23a2 comprises a third diode $D_3$ and a fourth diode $D_4$. The cathode of the third diode $D_3$ is connected to the cathode of the fourth diode $D_4$ and the input terminal of the first filtering circuit 23a3. The anode of the third diode $D_3$ is connected to the output terminal of the first magnetic amplifier 23a1. The anode of the fourth diode $D_4$ is electrically connected to the common terminal. The second rectifying circuit 23b2 comprises a fifth diode $D_5$ and a sixth diode $D_6$. The cathode of the fifth diode $D_5$ is connected to the cathode of the sixth diode $D_6$ and the input terminal of the second rectifying circuit 23b2. The anode of the fifth diode $D_5$ is connected to the output terminal of the second magnetic amplifier 23b1. The anode of the sixth diode $D_6$ is electrically connected to the common terminal.

In this embodiment, the first filtering circuit 23a3 comprises a first inductor $L_1$ and a first capacitor $C_1$. The first inductor $L_1$ has a terminal connected to a terminal of the first capacitor $C_1$ and the other terminal connected to the input terminal of the first filtering circuit 23a3. The other terminal of the first capacitor $C_1$ is electrically connected to the common terminal. The second filtering circuit 23b3 comprises a second inductor $L_2$ and a second capacitor $C_2$. The second inductor $L_2$ has a terminal connected to a terminal of the second capacitor $C_2$ and the other terminal connected to the input terminal of the second filtering circuit 23b3. The other terminal of the second capacitor $C_2$ is electrically connected to the common terminal.

In this embodiment, the rectifying and filtering circuit 223 comprises a seventh diode $D_7$, an eighth diode $D_8$, a third inductor $L_3$ and a third capacitor $C_3$. The cathode of the seventh diode $D_7$ is connected to the cathode of the eighth diode $D_8$ and a terminal of the third inductor $L_3$. The anode of the seventh diode $D_7$ is connected to the third secondary winding assembly $N_{s3}$ of the transformer T. The anode of the eighth diode $D_8$ is electrically connected to the common terminal. The other terminal of the third inductor $L_3$ is connected to the output terminal of the rectifying and filtering circuit 223 and a terminal of the third capacitor $C_3$. The other terminal of the third capacitor $C_3$ is electrically connected to the common terminal.

In this embodiment, the feedback circuit 224 comprises a first resistor $R_1$ and a second resistor $R_2$. The first resistor $R_1$ and the second resistor $R_2$ are connected in series to the output terminal of the feedback circuit 24. The other terminal of the second resistor $R_2$ is electrically connected to the common terminal. By the serially-connected resistors $R_1$ and $R_2$, DC output voltage $V_o$ is subject to voltage division so as to generate the feedback signal $V_f$.

Figure 5:
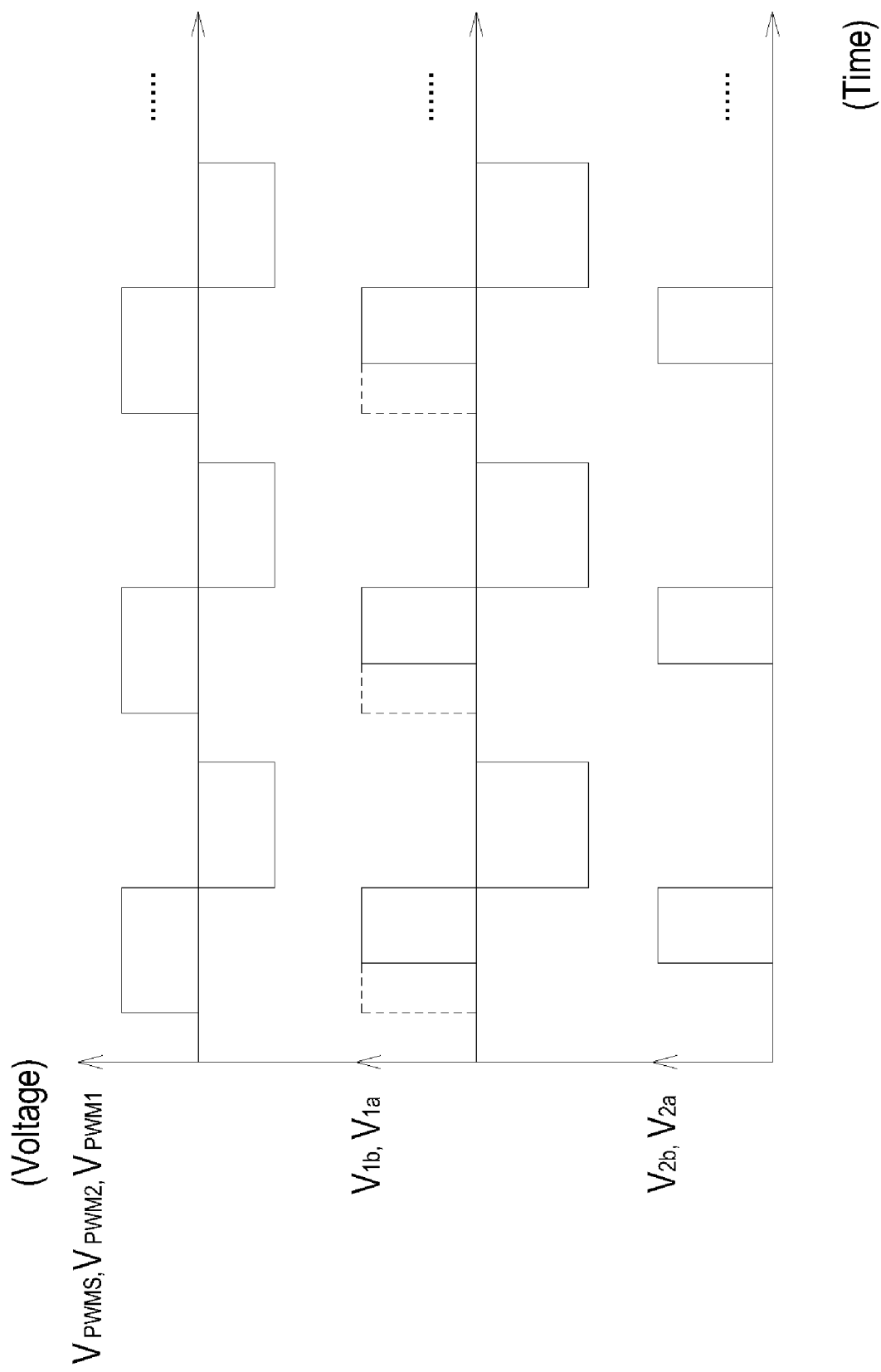
FIG. 5 is a timing waveform diagram illustrating related voltage signals described in the LED current-supplying circuit of FIGS. 2 and 3.

FIG. 5 is a timing waveform diagram illustrating related voltage signals described in the LED current-supplying circuit of FIGS. 2 and 3. Please refer to FIGS. 2, 3 and 5. The first pulse width modulation voltage $V_{PWM1}$ from the DC-to-DC converting circuit 22 is received by the first current-controlling circuit 23a. Due to the switching property of selectively conducting or shutting off the first magnetic amplifier 23a1, a portion of the electrical energy contained in the first pulse width modulation voltage $V_{PWM1}$ is selectively transmitted to the input terminal of the first rectifying circuit 23a2 through the first magnetic amplifier 23a1. In other words, the electrical energy contained in the first pulse width modulation voltage $V_{PWM1}$ is partially hindered from passing through the first magnetic amplifier 23a1. As shown in FIG. 5, the output voltage $V_{1a}$ of the first magnetic amplifier 23a1 excludes the hindered electrical energy, which is denoted as a dotted line. The output voltage $V_{1a}$ of the first magnetic amplifier 23a1 is rectified by the first rectifying circuit 23a2 to generate an output voltage $V_{2a}$ of the first rectifying circuit 23a2. Likewise, the output voltage $V_{2a}$ of the first rectifying circuit 23a2 excludes the dotted-line portion. The output voltage $V_{2a}$ of the first rectifying circuit 23a2 is filtered by the first filtering circuit 23a3 and provides a regulated DC voltage and the first current $I_1$ to the first LED string 24a. The regulated DC voltage and the first current $I_1$ will be changed according to the magnitude of hindered electrical energy of the first pulse width modulation voltage $V_{PWM1}$. The magnitude of hindered electrical energy of the first pulse width modulation voltage $V_{PWM1}$ is determined by adjusting the on duration and the off duration of the first magnetic amplifier 23a1 under control of the first magnetic amplifier controller 23a5. For precisely controlling the magnitude of the first current $I_1$, the first current detecting circuit 23a4 will detect the magnitude of the first current $I_1$ under control of the first magnetic amplifier controller 23a5. According to the magnitude of the first current $I_1$, the first magnetic amplifier controller 23a5 generates a first control current $I_{Mag1}$. According to the first control current $I_{Mag1}$, the first magnetic amplifier 23a1 is selectively conducted or shut off such that the magnitude of the first current $I_1$ is maintained at a certain level.

Similarly, the magnitude of hindered electrical energy of the second pulse width modulation voltage $V_{PWM2}$ is determined by adjusting the on duration and the off duration of the second magnetic amplifier 23b1 under control of the second magnetic amplifier controller 23b5. That is, the output voltage $V_{1b}$ of the second magnetic amplifier 23b1 excludes the hindered electrical energy, which is denoted as a dotted line. The output voltage $V_{1b}$ of the second magnetic amplifier 23b1 is rectified by the second rectifying circuit 23b2 to generate an output voltage $V_{2b}$ of the second rectifying circuit 23b2. The output voltage $V_{2b}$ of the second rectifying circuit 23b2 is filtered by the second filtering circuit 23b3 and provides a regulated DC voltage and the second current $I_2$ to the second LED string 24b. The regulated DC voltage and the second current $I_2$ will be changed according to the magnitude of hindered electrical energy of the second pulse width modulation voltage $V_{PWM2}$. For precisely controlling the magnitude of the second current $I_2$, the second current detecting circuit 23b4 will detect the magnitude of the second current $I_2$ under control of the second magnetic amplifier controller 23b5. According to the magnitude of the second current $I_2$, the second magnetic amplifier controller 23b5 generates a second control current $I_{Mag2}$. According to the second control current $I_{Mag2}$, the second magnetic amplifier 23b1 is selectively conducted or shut off such that the magnitude of the second current $I_2$ is maintained at a certain level.

In this embodiment, the first pulse width modulation voltage $V_{PWM1}$ inputted into the first current-controlling circuit 23a and the second pulse width modulation voltage $V_{PWM2}$ inputted into the second current-controlling circuit 23b are substantially identical. The first magnetic amplifier controller 23a5 and the second magnetic amplifier controller 23b5 have the same parameters. Consequently, the magnitude of the first current $I_1$ controlled by the first magnetic amplifier controller 23a5 is equal to the magnitude of the second current $I_2$ controlled by the second magnetic amplifier controller 23b5. In some embodiments, the first pulse width modulation voltage $V_{PWM1}$ and the second pulse width modulation voltage $V_{PWM2}$ are different. By simply setting the parameters of the first magnetic amplifier controller 23a5 and the second magnetic amplifier controller 23b5, the magnitude of the first current $I_1$ controlled by the first magnetic amplifier controller 23a5 will be equal to the magnitude of the second current $I_2$ controlled by the second magnetic amplifier controller 23b5.

In some embodiments, the LED current-supplying circuit 2 further comprises a brightness-adjustable circuit (not shown), which is electrically connected to the first magnetic amplifier controller 23a5 and the second magnetic amplifier controller 23b5. By the brightness-adjustable circuit, the parameters of the first magnetic amplifier controller 23a5 and the second magnetic amplifier controller 23b5 are adjusted. As a consequence, the magnitude of the first current $I_1$ and the magnitude of the second current $I_2$ as well as the brightness values of the first LED string 24a and the second LED string 24b are adjusted.

Figure 4:
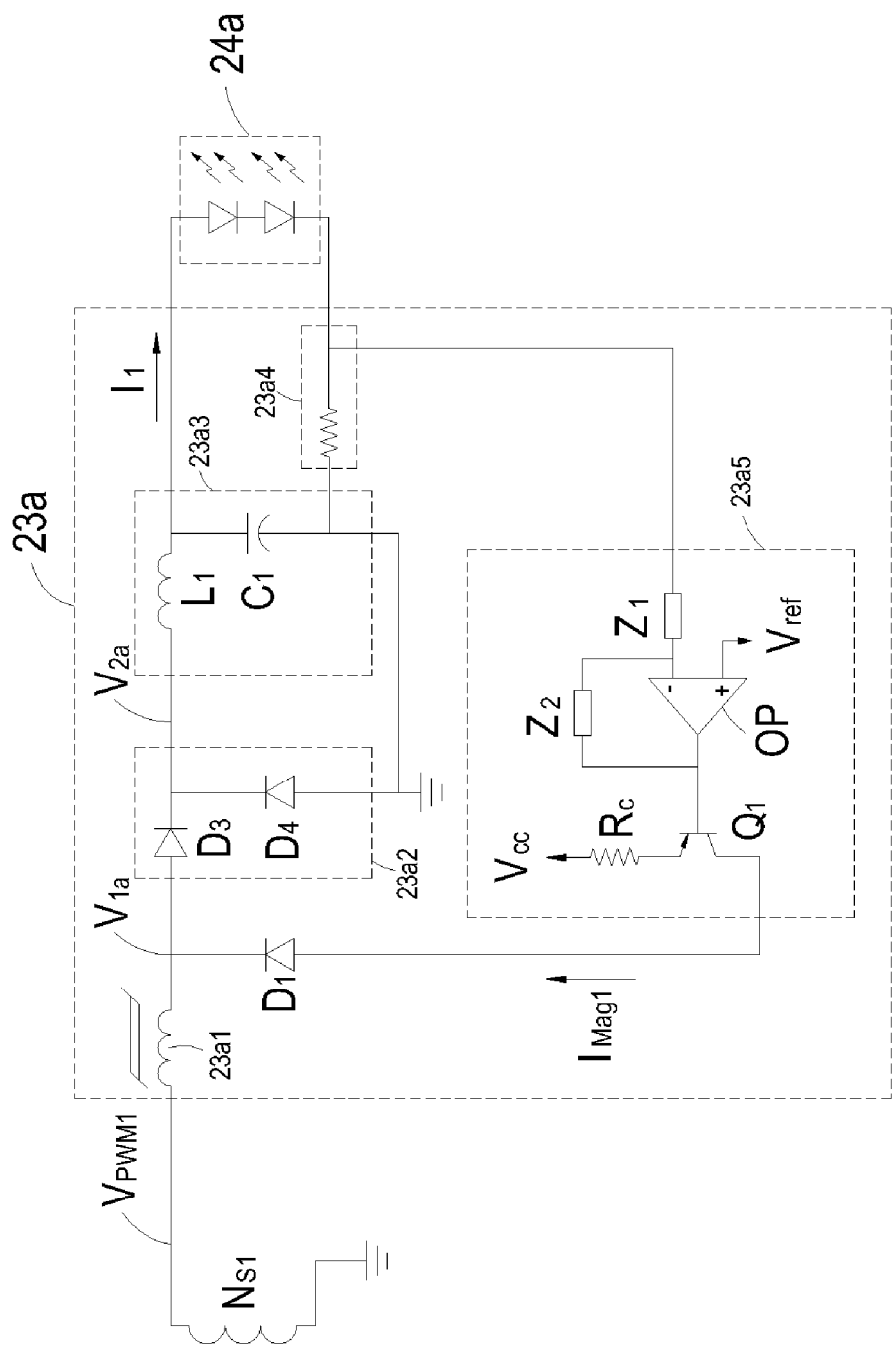
FIG. 4 is a schematic circuit block diagram illustrating a portion of the LED current-supplying circuit of FIG. 2.

FIG. 4 is a schematic circuit block diagram illustrating a portion of the LED current-supplying circuit of FIG. 2. Please refer to FIGS. 2 and 4. The first magnetic amplifier controller 23a5 comprises an operation amplifier OP, a current-limiting resistor $R_c$, a first transistor Q1, a first impedance $Z_1$ and a second impedance $Z_2$. The first impedance $Z_1$ has a terminal connected to the first current detecting circuit 23a4 and the other terminal connected to the negative terminal of the operation amplifier OP and a terminal of the second impedance $Z_2$. A reference voltage $V_{ref}$ is inputted into the positive terminal of the operation amplifier OP. The output terminal of the operation amplifier OP is connected to the other terminal of the second impedance $Z_2$ and the base of the first transistor Q1. The current-limiting resistor $R_c$ has a terminal connected to a first DC voltage source $V_{cc}$ and the other terminal connected to the emitter of the first transistor Q1. The collector of the first transistor Q1 is connected to the anode of the first diode $D_1$. In some embodiments, the first magnetic amplifier controller 23a5 and the second magnetic amplifier controller 23b5 are magnetic amplifier controllers. By using the same software and parameters in the magnetic amplifier controllers, the magnitude of the first current $I_1$ and the magnitude of the second current $I_2$ are equal.

In the above embodiments, the LED current-supplying circuit 2 is illustrated by referring to two current-controlling circuits. Nevertheless, the LED current-supplying circuit 2 may have three or more than three current-controlling circuits. Each current-controlling circuit has similar circuitry configuration similar to the first current-controlling circuit 23a and the second current-controlling circuit 23b. As a result, the three or more than three current-controlling circuits can provide electricity to three or more than three LED strings so as to achieve equal current sharing among these LED strings.

It is noted that, however, those skilled in the art will readily observe that numerous modifications and alterations may be made while retaining the teachings of the invention. For example, in some embodiments, the first current-controlling circuit 23a only comprises a first magnetic amplifier 23a1, a first current detecting circuit 23a4, a first diode $D_1$ and a first magnetic amplifier controller 23a5. The first magnetic amplifier 23a1 has a terminal connected to the first output terminal of the DC-to-DC converting circuit 22 and the other terminal connected to the cathode of the first diode $D_1$ and the first LED string 24a. The first current detecting circuit 23a4 is connected to the first LED string 24a and the output loop of the first current-controlling circuit 23a in series. The first magnetic amplifier controller 23a5 is connected to the anode of the first diode $D_1$ and the first current detecting circuit 23a4. Consequently, the output voltage $V_{1a}$ of the first magnetic amplifier 23a1 is directly transmitted to the first LED string 24a and generates the first current $I_1$ to power the first LED string 24a without the need of passing through the first rectifying circuit 23a2 and the first filtering circuit 23a3.

Similarly, the second current-controlling circuit 23b only comprises a second magnetic amplifier 23b1, a second current detecting circuit 23b4, a second diode $D_2$ and a second magnetic amplifier controller 23b5. The second magnetic amplifier 23b1 has a terminal connected to the second output terminal of the DC-to-DC converting circuit 22 and the other terminal connected to the cathode of the second diode $D_2$ and the second LED string 24b. The second current detecting circuit 23b4 is connected to the second LED string 24b and the output loop of the second current-controlling circuit 23b in series. The second magnetic amplifier controller 23b5 is connected to the anode of the second diode $D_2$ and the second current detecting circuit 23b4. Consequently, the output voltage $V_{1b}$ of the second magnetic amplifier 23b1 is directly transmitted to the second LED string 24b and generates the second current $I_2$ to power the second LED string 24b without the need of passing through the second rectifying circuit 23b2 and the second filtering circuit 23b3.

From the above description, the LED current-controlling circuit of the present invention is capable of balancing the currents passing through the LED strings without the need of using the conventional secondary DC-to-DC converting circuit. In other words, the LED current-controlling circuit can directly receives the pulse width modulation voltage from the primary DC-to-DC converting circuit, thereby generating a regulated DC voltage to power the LCD strings. By adjusting parameters of the magnetic amplifier controller, the currents passing through all LED strings are identical and thus all LEDs have the same brightness values. Consequently, the overall circuitry cost is reduced but the current intensity is enhanced.

Moreover, the LED current-supplying circuit of the present invention needs only one primary DC-to-DC converting circuit to provide the pulse width modulation voltage to the LED current-controlling circuit. In other words, the primary DC-to-DC converting circuit doesn't need to generate the bus voltage of a specified DC voltage level. By adjusting parameters of the magnetic amplifier controller, the currents passing through all LED strings are identical and thus all LEDs have the same brightness values, thereby achieving high efficiency, low circuitry cost and high current density.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A LED current-controlling circuit for receiving a pulse width modulation voltage and outputting a first current having a specified DC current level required to power a first LED string of multiple LED strings, said LED current-controlling circuit comprising:
   a first magnetic amplifier having a terminal connected to an input terminal of said LED current-controlling circuit and the other terminal connected to said first LED string;
   a first current detecting circuit connected to said first LED string in series for detecting said first current flowing through said first LED string;
   a first magnetic amplifier controller connected to said first current detecting circuit for controlling on/off statuses of said first magnetic amplifier; and
   a first diode having a terminal connected to an output terminal of said first magnetic amplifier and said first LED string and the other terminal connected to said first magnetic amplifier controller, wherein said first magnetic amplifier controller controls on/off statuses of said first magnetic amplifier according to the magnitude of said first current, thereby maintaining said first current at said specified DC current level;
   wherein the magnitude of said first current flowing through said first LED string is equal to the magnitude of the current flowing through at least one of the other LED strings.

2. The LED current-controlling circuit according to claim 1 wherein said LED current-controlling circuit further comprises a first rectifying circuit interconnected between said first magnetic amplifier and said first LED string for rectification.

3. The LED current-controlling circuit according to claim 2 wherein said first rectifying circuit further comprises a third diode and a fourth diode, the cathode of said third diode is connected to the cathode of said fourth diode and an output terminal of said first rectifying circuit, the anode of said third diode is connected to an output terminal of said first magnetic amplifier, and the anode of said fourth diode is connected to a common terminal.

4. The LED current-controlling circuit according to claim 2 wherein said first LED current-controlling circuit further comprises a first filtering circuit interconnected between said first rectifying circuit and said first LED string.

5. The LED current-controlling circuit according to claim 4 wherein said first filtering circuit comprises a first inductor and a first capacitor, said first inductor has a terminal connected to a terminal of said first capacitor and the other terminal connected to an input terminal of said first filtering circuit, and other end of said first capacitor is connected to said common terminal.

6. The LED current-controlling circuit according to claim 1 wherein said first magnetic amplifier controller generates a first control circuit according to the magnitude of said first current, and said first magnetic amplifier is selectively conducted or shut off according to said first control current.

7. The LED current-controlling circuit according to claim 1 wherein said first current detecting circuit is a resistor.

8. The LED current-controlling circuit according to claim 1 wherein said first magnetic amplifier controller comprises:
a first impedance having a terminal connected to said first current detecting circuit;
an operation amplifier having a negative terminal connected to the other terminal of said first impedance and a positive terminal receiving a reference voltage;
a second impedance having a terminal connected to said negative terminal of said operation amplifier and the other terminal connected to an output terminal of said operation amplifier;
a first transistor having a base connected to said output terminal of said operation amplifier and a collector connected to said first diode; and
a current-limiting resistor having a terminal connected to a first DC voltage source and the other terminal connected to an emitter of said first transistor.

9. A LED current-supplying circuit for driving a first LED string and a second LED string, said LED current-supplying circuit comprising:
a main power rectifying circuit for receiving and rectifying an AC input voltage into a rectified input voltage;
a primary DC-to-DC converting circuit having an input terminal connected to an output terminal of said main power rectifying circuit for converting said rectified input voltage into a first pulse width modulation voltage and a second pulse width modulation voltage;
a first current-controlling circuit having an input terminal connected to a first output terminal of said primary DC-to-DC converting circuit and an output terminal connected to said first LED string; and
a second current-controlling circuit having an input terminal connected to a second output terminal of said primary DC-to-DC converting circuit and an output terminal connected to said second LED string, wherein said first pulse width modulation voltage and said second pulse width modulation voltage are respectively received by said first current-controlling circuit and said second current-controlling circuit, thereby generating a first current and a second current;
wherein the magnitude of said first current is equal to the magnitude of said second current.

10. The LED current-supplying circuit according to claim 9 wherein said primary DC-to-DC converting circuit comprises:
a transformer comprising a primary winding assembly, a first secondary winding assembly, a second secondary winding assembly and a third secondary winding assembly, wherein said primary winding assembly is connected to said output terminal of said main power rectifying circuit;
a switching circuit connected to said primary winding assembly and a common terminal; and a pulse width modulation controller connected to said switching circuit for controlling on/off status of said switching circuit such that said first secondary winding assembly and said second secondary winding assembly generate said first pulse width modulation voltage and said second pulse width modulation voltage, respectively.

11. The LED current-supplying circuit according to claim 10 wherein said primary DC-to-DC converting circuit further comprises:
a rectifying and filtering circuit having an input terminal connected to said third secondary winding assembly for rectifying and filtering a main pulse width modulation voltage generated by said third secondary winding assembly; and
a feedback circuit having an input terminal connected to an output terminal of said rectifying and filtering circuit and an output terminal connected to said pulse width modulation controller for issuing a feedback signal to said pulse width modulation controller.

12. The LED current-supplying circuit according to claim 11 wherein said pulse width modulation controller controls on duration and off duration of said switching circuit according to said feedback signal, so that duty ratios of said first pulse width modulation voltage and said second pulse width modulation voltage are automatically adjusted.

13. The LED current-supplying circuit according to claim 11 wherein said feedback circuit further comprises a first resistor and a second resistor, said first resistor and said second resistor are connected in series to an output terminal of said feedback circuit, and the other terminal of said second resistor is connected to said command terminal so that said feedback signal is generated by said first resistor and said second resistor.

14. The LED current-supplying circuit according to claim 10 wherein said primary DC-to-DC converting circuit further comprises a reset circuit, which is connected to said primary winding assembly of said transformer, for resetting electrical energy contained in said transformer.

15. The LED current-supplying circuit according to claim 9 wherein said first current-controlling circuit comprises:
a first magnetic amplifier having a terminal connected to an input terminal of said first current-controlling circuit;
a first rectifying circuit having an input terminal connected to the other terminal of said first magnetic amplifier for rectification;
a first filtering circuit having an input terminal connected to an output terminal of said first rectifying circuit and an output terminal connected to said first LED string;
a first current detecting circuit connected to said first LED string in series for detecting said first current flowing through said first LED string; and
a first magnetic amplifier controller connected to said first current detecting circuit for controlling on/off statuses of said first magnetic amplifier, wherein said first magnetic amplifier controller controls on/off statuses of said first magnetic amplifier according to the magnitude of said first current, thereby maintaining said first current at a specified DC current level.

16. The LED current-supplying circuit according to claim 15 wherein said first magnetic amplifier controller generates a first control circuit according to the magnitude of said first current, and said first magnetic amplifier is selectively conducted or shut off according to said first control current.

17. The LED current-supplying circuit according to claim 15 wherein said first current detecting circuit is a resistor.

18. The LED current-supplying circuit according to claim 15 wherein said first magnetic amplifier controller comprises:

a first impedance having a terminal connected to said first current detecting circuit;

an operation amplifier having a negative terminal connected to the other terminal of said first impedance and a positive terminal receiving a reference voltage;

a second impedance having a terminal connected to said negative terminal of said operation amplifier and the other terminal connected to an output terminal of said operation amplifier;

a first transistor having a base connected to said output terminal of said operation amplifier and a collector connected to said first diode; and a current-limiting resistor having a terminal connected to a first DC voltage source and the other terminal connected to an emitter of said first transistor.

* * * * *